US007321670B2

(12) United States Patent
Yoon et al.

(10) Patent No.: US 7,321,670 B2
(45) Date of Patent: Jan. 22, 2008

(54) SYSTEM AND METHOD FOR DETECTING FACE

(75) Inventors: Sang-min Yoon, Kyungki-do (KR); Seok-cheol Kee, Kyungki-do (KR)

(73) Assignee: Samsung Electronics Co., Ltd., Suwon, Kyungki-do (KR)

( * ) Notice: Subject to any disclaimer, the term of this patent is extended or adjusted under 35 U.S.C. 154(b) by 777 days.

(21) Appl. No.: 10/699,879

(22) Filed: Nov. 4, 2003

(65) Prior Publication Data

US 2004/0091137 A1    May 13, 2004

(30) Foreign Application Priority Data

Nov. 4, 2002    (KR)    ............... 10-2002-0067974

(51) Int. Cl.
*G06K 9/00* (2006.01)
(52) U.S. Cl. .................................... 382/118
(58) Field of Classification Search ............... 382/224, 382/118, 117
See application file for complete search history.

(56) References Cited

U.S. PATENT DOCUMENTS

| 5,438,629 | A | * | 8/1995 | Moed et al. ............ 382/156 |
| 5,710,833 | A | * | 1/1998 | Moghaddam et al. ....... 382/228 |
| 6,430,306 | B2 | * | 8/2002 | Slocum et al. ........... 382/118 |
| 6,608,914 | B1 | * | 8/2003 | Yamaguchi et al. ........ 382/118 |
| 6,944,319 | B1 | * | 9/2005 | Huang et al. ............ 382/118 |
| 7,123,754 | B2 | * | 10/2006 | Matsuo et al. ........... 382/118 |

FOREIGN PATENT DOCUMENTS

| JP | 08-083341 A | 3/1996 |
| JP | 1998-82154 | 11/1998 |
| JP | 2000-0061100 | 10/2000 |
| JP | 2001-092963 A | 4/2001 |
| JP | 2001-169272 A | 6/2001 |

OTHER PUBLICATIONS

European Search Report dated Feb. 26, 2004 for corresponding application EP 03 25 6953.
Tae-Kyunkim et al., "Component-Based LDA Face Descriptor for Image Retrieval", Proceedings of the 13th British Machine Vision Conference, 2002, pp. 507-516, vol. 2, Cardiff University, England.
David J. Oziem, "Face Recognition Techniques and the Implications of Facial Transformations", Bachelor Dissertation, Computer Science Department, 2002, pp. 17-34, University of Bristol, England.
G.A. Mota et al., "Face Detector Combining Eigenfaces, Neural Network and Bootstrap", Proc. Brazilian Symposium on neural Networks, 2000, p. 290, Left-hand column, Paragraph 5.

(Continued)

*Primary Examiner*—Matthew C. Bella
*Assistant Examiner*—Dennis Rosario
(74) *Attorney, Agent, or Firm*—Buchanan Ingersoll & Rooney PC

(57) ABSTRACT

The present invention relates to a system and method for detecting a face that is capable of quickly and correctly deciding whether an input facial image is occluded, regardless of any type of facial image to be inputted. The present invention is characterized in that eigenvectors and weights are extracted from the input facial image using principal component analysis (PCA) and the extracted eigenvectors and weights of the user image are substituted into a occluding-decision algorithm, whereby it can be determined whether the facial image is occluded.

16 Claims, 5 Drawing Sheets

OTHER PUBLICATIONS

Hyun-Chul Kim et al., "Face Recognition Using the Mixture-of-Eigenfaces Method", Pattern Recognition Letters, 2002, pp. 1549-1588, Elsevier Science B.V.

Aleix M. Martinez et al., "PCA Versus LDA", IEEE Transactions on Pattern Analysis and Machine Intelligence, 2001, pp. 228-233, vol. 23, No. 2, IEEE Inc., New York, USA.

Official Action issued by the Japanese Patent Office in corresponding JP Application No. 2003-374316, Sep. 27, 2006, JAPAN.

Yingjie Wang et al., "*Facial feature detection and face recognition from 2D and 3D images*", Pattern Recognition Letters (an official publication of the International Association for Pattern Recognition), Aug. 2002, pp. 1191-1202, vol. 23, No. 10, Elsevier B.V., North-Holland.

Summons to attend oral proceedings pursuant to Rule 71(1) EPC and attached Communication, Issued by the European Patent Office on Jan. 3, 2007 in corresponding European Patent Application No. 03256953.5, EPO, Munich, DE.

Müller, Klaus-Robert, et al., "*An Introduction to Kernel-Based Learning Algorithms*", IEEE Transactions on Neural Networks, Mar. 2001, vol. 12, No. 2, IEEE, USA.

* cited by examiner

SYSTEM AND METHOD FOR DETECTING FACE

BACKGROUND OF THE INVENTION

This application claims the priority of Korean Patent Application No. 10-2002-0067974 filed on Nov. 4, 2002, in the Korean Intellectual Property Office, the disclosure of which is incorporated herein in its entirety by reference.

1. Field of Invention

The present invention relates to a system and method for detecting a face, and more particularly, to a system and method for detecting a face that is capable of quickly and correctly deciding, using an algorithm for determining whether a face is occluded, whether an input facial image is occluded.

2. Description of the Related Art

As the information society advances, automatic teller machines have rapidly come into wide use. Financial crimes in which money is illegally withdrawn using credit cards or passwords of other persons have also increased. To deter these financial crimes, a CCTV is installed in automatic teller machines to identify criminals. However, criminals often commit these crimes while wearing sunglasses or caps so as not to be photographed by the CCTV, and thus, it makes it difficult to identify the faces of the criminals.

Korean Patent No. 0306355 (entitled "User identification system and automatic teller machine using the same") discloses a user identification system for identifying the face of a user, by acquiring a facial image of the user, obtaining a facial region through filtering of only a skin color region, extracting an eye position from the obtained region, setting a range of a mouth and nose on the basis of the eye position, and checking whether confirmable characteristic points exist. However, the eye position is extracted and the mouth and nose positions are then extracted on the basis of the extracted eye positions. Thus, if eye positions are not extracted, it is difficult to extract the mouth and nose positions. Further, image data of the user is not searched but the presence of facial components (e.g., eyes, nose, mouth, and the like) is merely checked to identify the user. Thus, the face detection of a user cannot be correctly performed.

In addition, Korean Patent No. 0293897 (entitled "Method for recognizing face of user of bank transaction system") discloses a method for recognizing the face of a user, which comprises the steps of determining facial candidate entities matching with an input user image using chain tracking, extracting contour points and comparing brightness values of the contour points to search graphics corresponding to eyes and mouth of the user, calculating a recognition index for the face, extracting only a single facial candidate entity, and comparing the recognition index for the face of the extracted facial candidate entity with a reference recognition index for the face. However, the presence of the eyes and mouth is determined according to whether the contour points of the eyes or mouth have been extracted. Thus, there is a possibility of misrecognizing sunglasses as eyes in a case where the sunglasses a user wears are similar to the eyes of the user in view of their shape and size.

Furthermore, since conventional face detection technology uses color images, it is difficult to detect feature points for the nose and mouth of the user due to illumination. Consequently, the feature points of the nose and mouth of the user may not be detected. Therefore, there is also a problem in that the legal user may be recognized as an illegal user.

SUMMARY OF THE INVENTION

The present invention is conceived to solve the aforementioned problems. It is an object of the present invention to provide a system and method for detecting a face of a user that is capable of quickly and correctly deciding whether an input facial image is occluded although a variety of facial images under different conditions are inputted.

According to an aspect of the present invention for achieving the object, there is provided a system and method for detecting a face of a user, wherein it can be determined whether a facial image is occluded by extracting eigenvectors and weights from an input facial image of a user using PCA (Principal Component Analysis) and assigning the SVM (Support Vector Machines) to an algorithm for determining whether the image is occluded.

BRIEF DESCRIPTION OF THE DRAWINGS

The above and other objects and features of the present invention will become apparent from the following description of an embodiment given in conjunction with the accompanying drawings, in which.

DETAILED DESCRIPTION OF THE INVENTION

An embodiment of the present invention will now be described with reference to the accompanying drawings.

Figure 1:
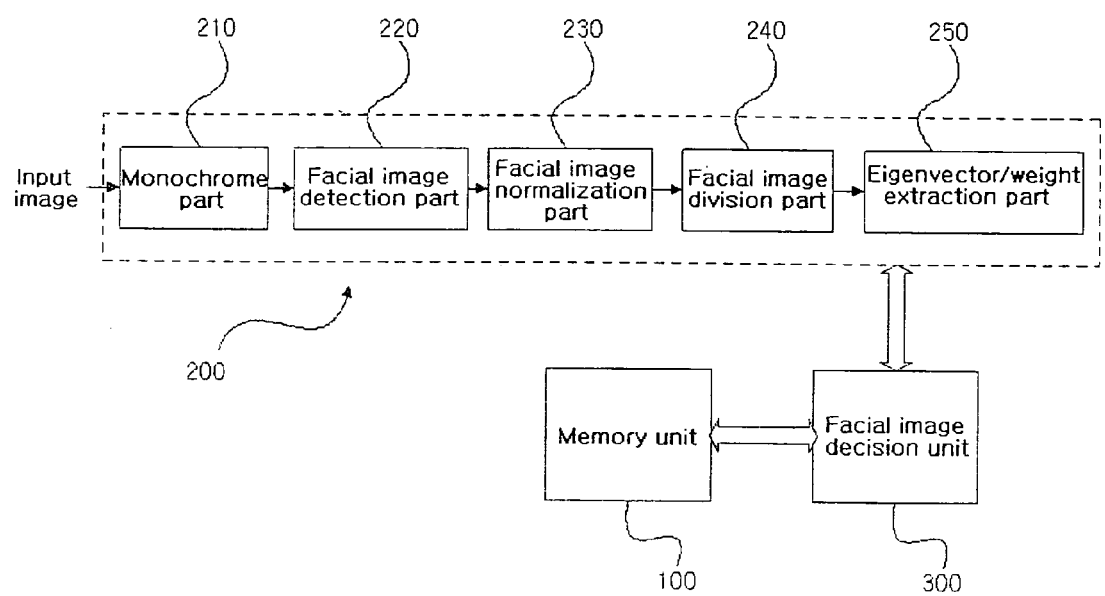
FIG. 1 is a schematic block diagram of a system for detecting the face of a user according to the present invention.

FIG. 1 is a block diagram of a system for detecting the face of a user according to the present invention. The system for detecting the face of a user comprises a memory unit 100, a facial image recognition unit 200, and a facial image decision unit 300. The memory unit 100 stores eigenvectors and weights extracted from a plurality of training images, which are classified into a normal facial image class and an occluded facial image class. The normal facial image class is obtained by extracting eigenvectors and weights from normal facial images to which illumination changes, countenance changes, beards, scaling shift and rotation changes are applied and storing the extracted eigenvectors and weights, and the occluded facial image class is obtained by extracting eigenvectors and weights from partly occluded facial images to which illumination changes, countenance changes, scaling shift and rotation changes are applied and storing the extracted eigenvectors and weights. That is, the normal facial images are identifiable facial images, and the occluded facial images are unidentifiable facial images because the faces are partly occluded with sunglasses, masks, mufflers and the like. Herein, the normal and occluded facial image classes are used to derive an occluding-decision algorithm, so as to decide whether the user facial images have been occluded. The normal facial image class has a value of 1, whereas the occluded facial image has a value of −1. A process of deriving an algorithm for deciding whether facial images are occluded will be explained in detail with reference to the following mathematical expressions.

The facial image recognition unit 200 functions to extract eigenvectors and weights from an input facial image using PCA to classify the normal and occluded face using Support Vector Machines and comprises a monochrome part 210, a facial image detection part 220, a facial image normalization part 230, a facial image division part 240, and an eigenvector/weight extraction part 250 using SVM.

The monochrome part 210 converts an input color image into a monochrome image. The reason for this is that since color and brightness components are mixed together in the color image configured in an RGB (Red, Green, Blue) mode, error due to brightness changes may be generated upon the extraction of the eigenvectors.

The facial image detector 220 uses a technique for dividing the input image into background and facial regions, and detects the facial region from the input image using Gabor filters. Here, a method of detecting a facial region using the Gabor filters is performed by applying some sets of Gabor filters having various directionalities and frequencies into the input image and then detecting the facial region in accordance with response values thereof.

The facial image normalization part 230 performs corrections for image brightness due to illumination, facial image size due to distance from the camera, inclination of the facial image, and the like to normalize the facial region.

The facial image division part 240 divides the normalized facial region into a higher region centered on the eyes and a lower region centered on the nose and mouth. Here, the reason for causing the facial region to be divided into the higher and lower regions is to quickly and correctly extract the eigenvectors of the respective facial components by restricting the size of the search region for each of the facial components since eigenvectors may be extracted from wrong region if the search region is too wide to extract the respective facial components. Further, since peripheral regions are eliminated noise components can be reduced.

The eigenvector/weight extraction part 250 extracts eigenvectors and weights of the eyes, nose and mouth, which are major components of the face, using PCA according to the divided facial regions. Here, eigenvectors of the eyes, nose and mouth can be simultaneously extracted, because the facial region in which the eyes, nose and mouth are located is restricted upon extraction of the eigenvectors.

Hereinafter, the mathematical expressions used for extracting the eigenvectors and weights using PCA will be described.

$$\Gamma = [r_1, r_2, r_3, \ldots, r_{IJ-1}, r_{IJ}] \quad (1)$$

$$\Gamma = [r_1', r_2', r_3', \ldots, r_{IJ-1}', r_{IJ}'] \quad (2)$$

$$\Psi = \frac{1}{N} \sum_{i=1}^{N} \Gamma_i \quad \text{[Formula 1]}$$

$$\Psi' = \frac{1}{M} \sum_{i=1}^{M} \Gamma_i,$$

where $\Gamma$ in Equation (1) represents facial images having a size of I×J stored in the normal facial image class of the memory unit 100, and $\Gamma$ in Equation (2) represents facial images having a size of I×J stored in the occluded facial image class of the memory unit 100.

Formula 1 is used to obtain an average facial image of the normal facial images and an average facial image of the occluded facial images, respectively. Here, N is the total number of normal facial images, and M is the total number of occluded facial images.

First, a method of extracting eigenvectors and weights based on the normal facial images will be explained.

$\Gamma$ is applied to $\Psi$ in Formula 1 so as to obtain the average facial image, and a vector $\Phi_i$ is then calculated by subtracting the average facial image ($\Psi$) from the facial images ($\Gamma$)

That is, $\Phi_i = \Gamma - \Psi$.

Using the vector $\Phi_i$ calculated as such, a covariance matrix is produced in accordance with Formula 2 below.

$$C = \frac{1}{N} \sum_{i=1}^{N} \Phi_i \Phi_i^T \quad \text{[Formula 2]}$$

$$C = \frac{1}{M} \sum_{i=1}^{N} \Phi_i \Phi_i^T$$

Eigenvalues ($\lambda_i$) and eigenvectors ($u_i$) can be calculated using Formula 2. In such a case, the eigenvalues are first calculated using the equation, $Cx = \lambda x$, and the eigenvectors are then calculated.

Thereafter weights can be calculated using the eigenvectors calculated as such in accordance with the following Formula 3.

$$W_f = (\Gamma - \Phi) \times u_i \quad \text{[Formula 3]}$$

Using Formula 3, the weights ($w_f$) are calculated.

Although only a method of extracting eigenvectors and weights from the normal facial images has been described above, a method of extracting eigenvectors and weights from the partly occluded facial images is performed in the same manner as the method of extracting eigenvectors and weights from the normal facial images. Further, eigenvectors and weights are extracted from the higher and lower regions in the facial region, respectively.

The facial image decision unit 300 decides whether the input facial image is occluded, through the occluding-decision algorithm that has been obtained from the training images stored in the memory unit 100. The occluding-decision algorithm, using Support Vector Machines, is expressed as the following Formula 4.

$$f(x) = \text{sign}\left(\sum_{i=1}^{l} y_i \lambda_i K(x, x_i) + b\right) \quad \text{[Formula 4]}$$

If a value obtained from the occluding-decision algorithm in Formula 4 is 1, the facial image is decided to be a normal one. On the other hand, if the value from the algorithm is −1, the facial image is determined to be a partly occluded one. This is because the algorithm for deciding whether the facial image is occluded has been configured after the normal and partly occluded facial images stored in the memory unit 100 are set to have class values of 1 and −1, respectively, and then trained.

In Formula 4 above, $y_i$, $\lambda_i$, and b are set by substituting a set of the class value (1, in the present invention) of the normal training image, the eigenvectors and the weights, which are stored in the memory unit 100, and another set of the class value (−1, in the present invention) of the partly occluded facial images, eigenvectors and weights, into Formula 4, respectively. These values may vary as the training images stored in the memory unit 100 are updated.

The formula for calculating the polynomial kernel K is expressed as follows:

$$K(x, x_i) = (<x \cdot x_i>)^d$$

where K can be calculated by an inner product of x and $x_i$ (i.e., $x \cdot x_i = |x||x_i| \cos(\theta)$), x is the weights, $x_i$ is the eigenvectors, and d is a constant.

Thus, the class value f(x) of the facial images, which will determine whether the facial images are occluded, can be obtained by applying $y_i$, $\lambda_i$ and b obtained using the eigenvectors and weights of the training images and then applying the eigenvectors and weights extracted from the facial images to the polynomial kernel $K(x, x_i)$.

Hereinafter, a process of calculating $y_i$, $\lambda_i$ and b of the occluding-decision algorithm will be described by way of example.

In a case where 5 frames of normal facial images and 8 frames of partly occluded facial images are stored in the memory unit 100, a method of deriving the factors ($y_i$, $\lambda_i$ and b) of the algorithm in Formula 4 is expressed as follows:

$$1 = \text{sign}\left(\sum_{i=1}^{1} y_i \lambda_i K(x, x_i) + b\right);$$

First image of the normal facial image $$1 = \text{sign}\left(\sum_{i=1}^{1} y_i \lambda_i K(x, x_i) + b\right);$$

Second image of the normal facial images $$1 = \text{sign}\left(\sum_{i=1}^{1} y_i \lambda_i K(x, x_i) + b\right);$$

Fifth image of the normal facial images $$-1 = \text{sign}\left(\sum_{i=1}^{1} y_i \lambda_i K(x, x_i) + b\right);$$

First image of the partly occluded facial images $$-1 = \text{sign}\left(\sum_{i=1}^{1} y_i \lambda_i K(x, x_i) + b\right);$$

Second image of the partly occluded facial images $$-1 = \text{sign}\left(\sum_{i=1}^{1} y_i \lambda_i K(x, x_i) + b\right);$$

Eighth image of the partly occluded facial images

As described above, the class value f(x) is set to 1 and −1 for the normal and partly occluded facial images, respectively, and eigenvectors and weights of the respective facial images are then applied to $K(x, x_i)$ so as to calculate $y_i$, $\lambda_i$ and b that satisfy the formulas.

Therefore, it can be correctly determined whether the facial images are occluded, by extracting eigenvectors and weights from the input facial images and substituting the extracted eigenvectors and weights into the occluding-decision algorithm.

Figure 2:
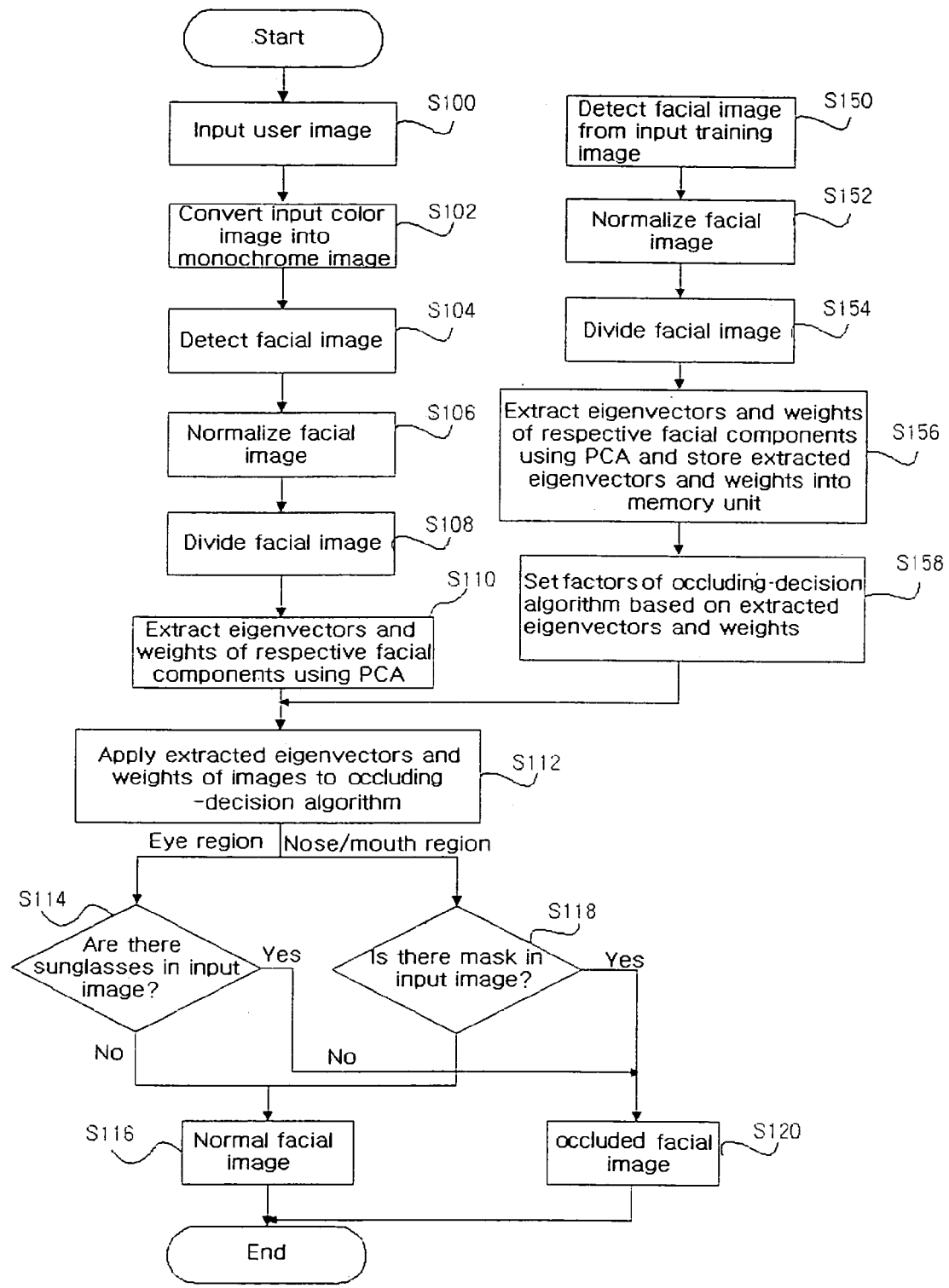
FIG. 2 is a flowchart illustrating the method for detecting the face of a user according to the present invention.

FIG. 2 is a flowchart illustrating a method for detecting a face according to the present invention. Referring to the FIGURE, steps S150 to S158 of deriving an algorithm for determining whether a face is occluded will be first discussed below.

A facial region is detected from an input training image (S150). Here, the input training image includes normal facial images to which illumination changes, countenance expression changes, beards, scaling shift and rotation changes are applied, and partly occluded facial images to which illumination changes, countenance changes, scaling shift and rotation changes are applied.

The detected facial region is normalized (S152), and the normalized facial region is then divided into a higher region centered on the eyes and a lower region centered on the nose and mouth (S154). Eigenvectors and weights of the respective facial components are extracted using PCA according to the divided facial regions and are stored in the memory unit 100 (S156). Since the detection of the eigenvectors and weights in the facial region has been illustrated in detail with reference to Formulas 1 to 3, the detailed explanation thereof will be omitted.

Next, the factors of the algorithm for determining whether the face is occluded are set on the basis of the stored eigenvectors and weights (S153).

Steps S150 to S158 are to derive the algorithm for determining whether the face is occluded. After the hiding-decision algorithm has been derived, steps S100 to S120 of deriving the occluding-decision algorithm are not performed any longer.

Hereinafter, the process of determining whether an input user image is occluded will be discussed as follows.

If a user image is inputted (S100), the input color image is converted into a monochrome image (S102) and a facial region is then detected from the monochrome image using the Gabor filter response (S104). Thus, the use of a monochrome facial image can reduce improper recognition problems involved with facial color due to makeup, skin color, etc.

Then, the size, brightness, inclination and the like of the facial image are corrected, and the facial region is then normalized (S106). The normalized facial region is divided into a higher region centered on the eyes and a lower region centered on the nose and mouth (S108). Consequently, the sizes of search regions in the respective facial components (the eyes, nose and mouth) are limited (FIG. 4).

Figure 4:
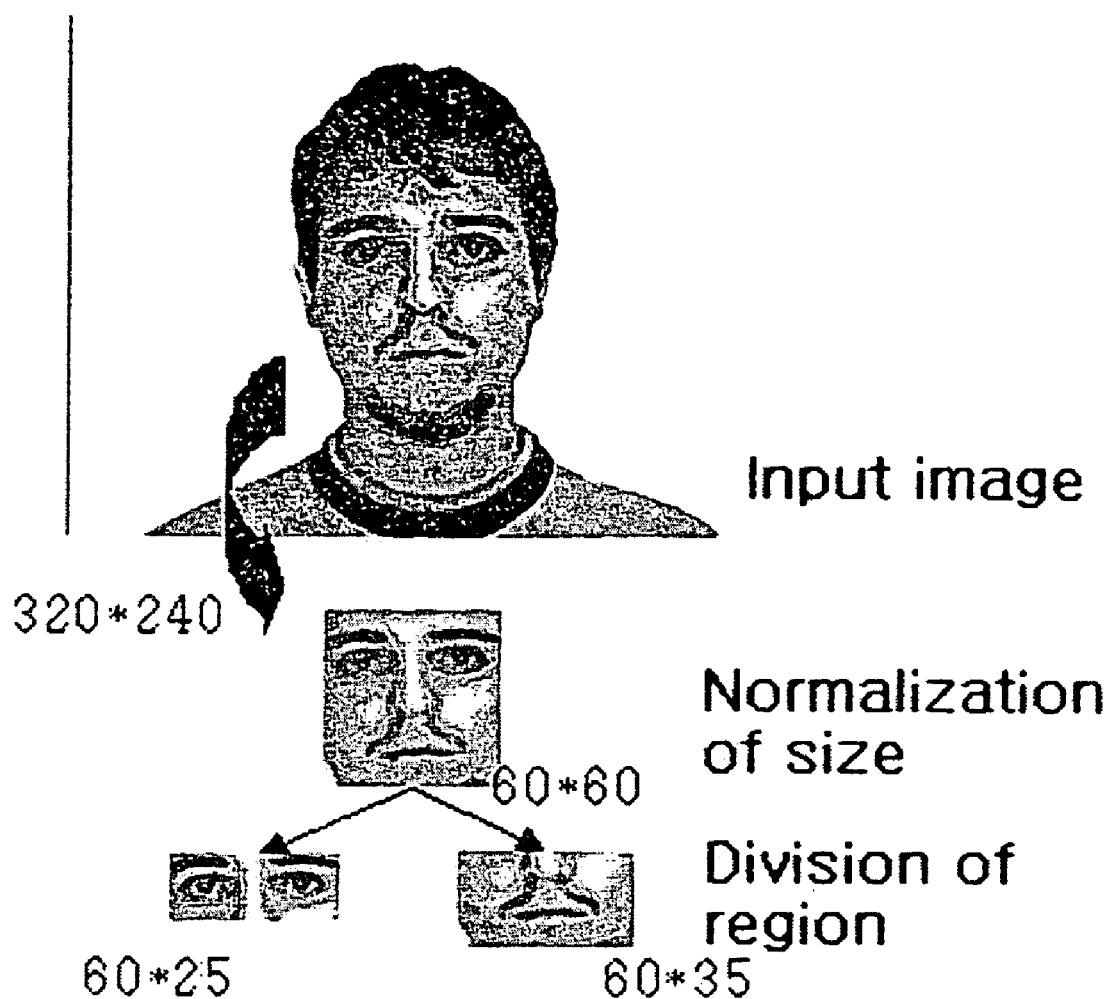
FIG. 4 is a diagram illustrating an embodiment of the present invention in which the size of the facial image is normalized.

Preferably, an entire facial image (320*240) is normalized into 60*60, and an eye region is set to (0,5) to (60,30), i.e. 60*25, and a nose and mouth region is set to (0,25) to (60,60), i.e. 60*35, in the normalized facial image, as shown in FIG. 4. If the eye region and the nose and mouth region are set according to the above size, a region corresponding to (0,25) to (60,30) overlaps by about 10%. This is because the size and position of the eyes, nose and mouth vary according to the input facial image and the images of the eyes, nose and mouth detected in the corresponding regions may be disconnected in cases where the eye region and the nose and mouth region are too small.

Furthermore, since the respective facial components are extracted from the restricted region, the size of the search region is limited. Thus, time needed for extracting the eigenvectors of the facial components can be reduced and noise components such as hair and background can also be reduced.

Using PCA on the basis of the divided facial regions, the eigenvectors and weights of the eyes are extracted in the higher region and the eigenvectors and weights of the nose and mouth are similarly extracted in the lower region (S110).

Next, the extracted eigenvectors and weights of the user image are applied to the occluding-decision algorithm that has been derived from steps S150 to S158 (S112). That is, the detected eigenvectors and weights of the user image are applied to $K(x,x_i)$, and the class values $f(x)$ are then calculated by using the values of $y_i$, $\lambda_i$ and b obtained through the eigenvectors and weights of the training image. Here, the class value $f(x)$ may be obtained according to the higher and lower regions, respectively.

Thereafter, it is determined whether the class values $f(x)$ of the higher and lower regions are 1 or −1, in order to determine whether the facial image is occluded (S114 and S118). Thus, if the value obtained through the occluding-decision algorithm is 1, it is determined that the facial image is normal (S116). On the other hand, if the value obtained through the algorithm is 31 1, it is determined that the facial image is partly occluded (S120).

In the meantime, the determination of whether the facial image is occluded is performed at the same time in the higher and lower regions of the user image. In such a case, if it is determined that any one of the higher and lower regions is a occluded facial image, it should be determined that the user's facial image is occluded. At this time, since it is simultaneously determined whether the facial images in the higher and lower regions are occluded, it can be more quickly determined that the facial image is occluded.

Figure 3:
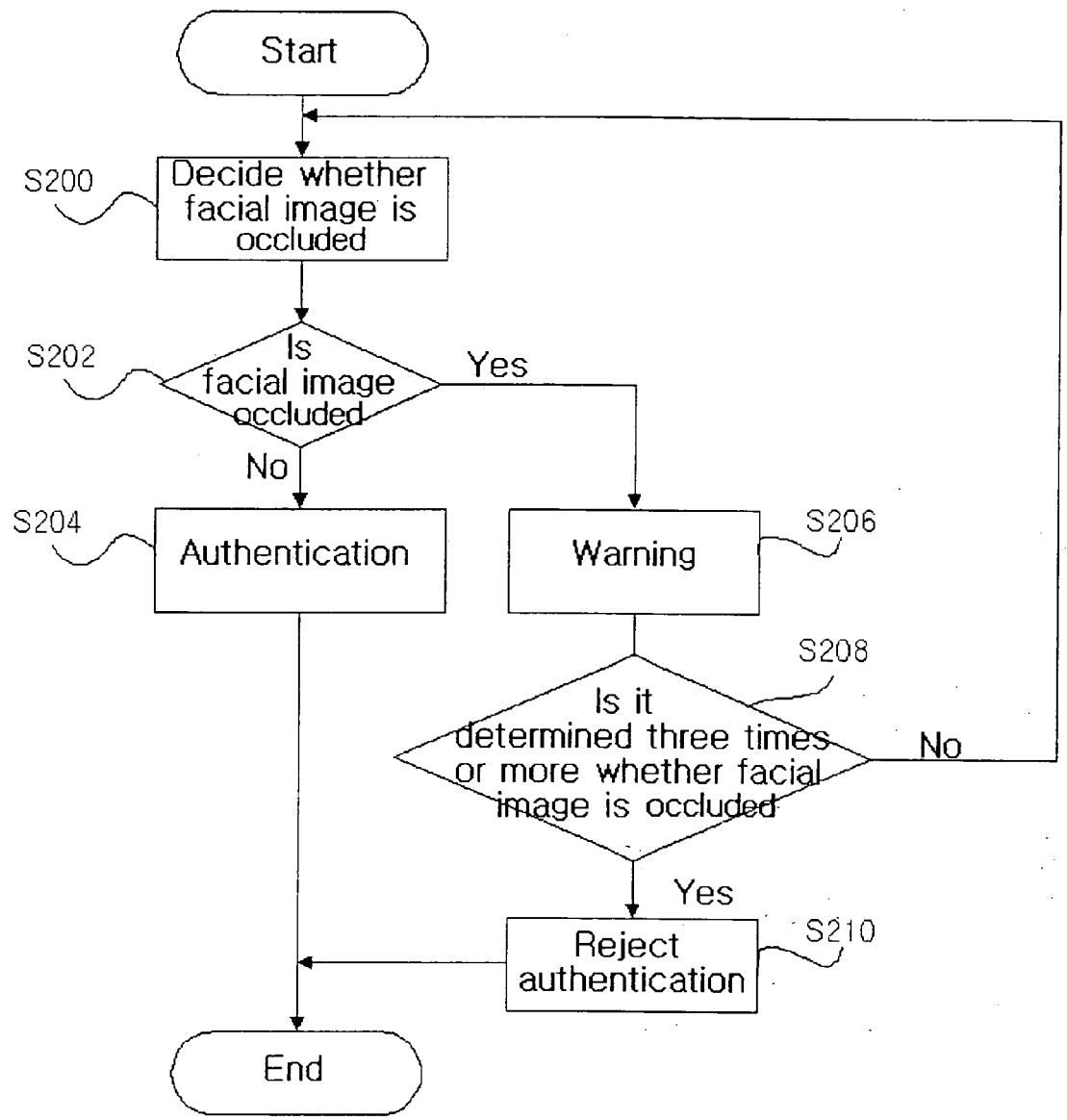
FIG. 3 is a flowchart illustrating a method for authenticating a facial image to which the method for detecting the face according to the present invention is applied.

FIG. 3 is a flowchart illustrating a method for authenticating a facial image to which the method for detecting a face according to the present invention is applied. It is first determined whether an input facial image of the user is occluded (S200). Here, the determination whether the input facial image of the user is occluded can be made in the same manner as steps S100 to S120 shown in FIG. 2.

Accordingly, if the facial image of the user is determined to be normal, user authentication is performed (S202). If it is determined that the facial image of the user is occluded, a warning message is transmitted to the user (S206). Then, operations of detecting the user's facial image and deciding whether the facial image, is occluded are performed again (S200). At this time, when it is determined three or more times that the facial image of the user has been occluded (S208), user authentication is rejected (S210).

Figure 5A:
FIGS. 5a and 5b are pictures illustrating examples of a plurality of training images.
Figure 5A:
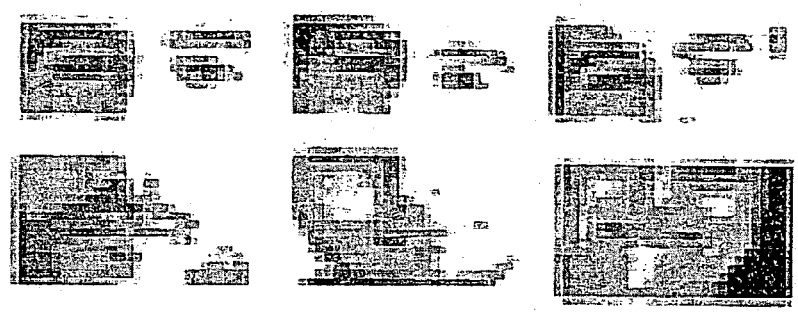
Figure 5B:
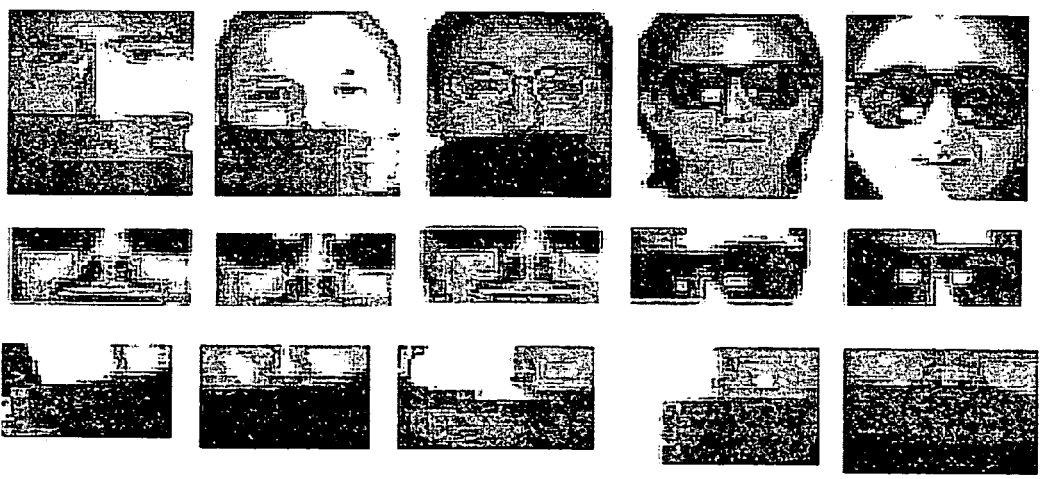

FIGS. 5a and 5b are pictures illustrating examples of a plurality of training images. In particular, FIG. 5a shows a normal facial image class including images under different illumination conditions, images with countenance thereof different from one another, images with beards therein, and images with scaling shift or rotation change included therein. Herein, the eigenvectors and weights of the facial images, in which features of the facial components (the eyes, nose, mouth, etc.) changeable according to illumination changes, countenance changes, beards and face inclination are fully considered, are stored in the normal facial image class. On the other hand, FIG. 5b shows a occluded facial image class including images of users wearing sunglasses, mufflers, etc. The eigenvectors and weights of the facial images, in which features of the facial components changeable according to sunglasses, mufflers, masks, illumination changes, countenance changes, scaling shift,rotation change, etc. are fully considered, are stored in the occluded facial image class. Therefore, since facial images under all conditions are included in the form of the training images in the class, it can be correctly determined whether the input facial images are occluded.

Tables 1 and 2 below show examples in which performance of the algorithm for deciding whether a facial image is occluded according to the present invention is tested using the memory unit 100 in which 3200 normal facial images, 2900 facial images of users wearing sunglasses, 4500 facial images of users wearing masks and mufflers, and additional images without any facial images, etc. are stored.

Table 1 represents test results performed by extracting 100 eigenvectors respectively from the normal facial image class and the occluded facial image class.

TABLE 1

|  | Number of Support Vectors | Number of Errors Occurring |
| --- | --- | --- |
| Higher Region | 250 | 0 |
| Lower Region | 266 | 1 |

That is, the determination of whether a facial image is occluded has been made at least 200 times based on the extracted eigenvectors. As a result, it can be understood that a low error generation rate is obtained.

Table 2 below represents results of the same test for occluded facial images as that for the normal facial image when results obtained when the determination for the normal image of whether the image is occluded show a 98% search rate. Table 2 shows test results for 370 facial images of users wearing sunglasses (i.e., in the higher region) and 390 facial images of users wearing mufflers (i.e. in the lower region).

TABLE 2

|  | Search Rate | Improper Recognition Rate |
| --- | --- | --- |
| Higher Region | 95.2% | 2.4% |
| Lower Region | 98.8% | 0% |

As a result of the test, it can be understood that the determination whether a user's facial region is occluded is made at the search rate of 95% or above and that improper recognition due to the occluding of a user's facial features is extremely low.

Since facial images under all conditions capable of being produced with the training images are included, the occluding-decision algorithm that can be employed for all facial images under various conditions can be derived. Thus, a highly successful search rate can be obtained when it is determined whether the facial image of the user is occluded.

According to the present invention constructed as such, there is an advantage in that it can be correctly and quickly determined through the occluding-decision algorithm whether input facial images of the users are occluded, even though a variety of facial images are inputted.

Further, there are advantages in that since the input facial image is divided into a higher region and a lower region to restrict the search regions of the respective facial components, processing time needed for extracting eigenvectors and weights of the respective facial components can be reduced, noise components such as hair and background in the images can also be reduced, and eigenvectors and weights of the eyes, nose and mouth in the respective relevant regions can be simultaneously extracted.

Furthermore, there is another advantage in that any influence of the background or illumination can be reduced because of the use of monochrome images, and thus, improper recognition problems, which may occur upon extraction of the eigenvectors, can also be reduced.

Although the present invention has been described in connection with the preferred embodiment thereof shown in the accompanying drawings, they are mere examples of the present invention. It can also be understood by those skilled in the art that various changes and modifications thereof can be made thereto without departing from the scope and spirit of the present invention defined by the claims. Therefore, the true scope of the present invention should be defined by the technical spirit of the appended claims.

What is claimed is:

1. A system for detecting a face, comprising:
a memory unit for storing eigenvectors and weights extracted from a plurality of training images;
a facial image recognition unit for extracting eigenvectors and weights of respective face components from an input facial image; and
a facial image decision unit for deriving an algorithm for deciding whether input facial images are occluded using the eigenvectors and weights of the training images stored in the memory unit, and for deciding whether the input facial image is occluded by substituting the eigenvectors and weights of the input image extracted in the facial image recognition unit into the derived algorithm,
wherein the deciding algorithm is expressed as the following equation:

$$f(x) = \text{sign}\left(\sum_{i=1}^{l} y_i \lambda_i K(x, x_i) + b\right),$$

where $y_i$, $\lambda_i$ and b are factors obtained from the training images, and $K(x, x_i)$ is eigenvectors and weights extracted from the input facial image, and
wherein the facial image decision unit is configured to decide the input facial image to be normal if a result value obtained by substituting the eigenvectors and weights into the decision algorithm is 1 and to decide the input facial image to be occluded if the result value is −1.

2. The system according to claim 1, wherein the eigenvectors and weights of the training images stored in the memory unit are classified into a normal facial image class and a occluded facial image class.

3. The system according to claim 1, wherein the facial image recognition unit is configured to extract eigenvectors and weights of the respective facial components from the training images.

4. The system according to claim 1, wherein the facial image recognition unit comprises:
a monochrome part for converting an input color image into a monochrome image;
a facial image detection part for detecting a facial region from the converted monochrome image;
a facial image normalization part for normalizing the detected facial region;
a facial image division part for dividing the normalized facial region into higher and lower regions; and
an eigenvector/weight extraction part for extracting the eigenvectors and weights of the respective facial components using a principal component analysis (PCA) according to the divided facial regions.

5. The system according to claim 4, wherein the facial image division part is configured to divide an entire facial region into the higher region centered on the eyes and the lower region centered on the nose and mouth.

6. The system according to claim 4, wherein the eigenvector/weight extraction part is configured to extract the eigenvectors and weights from the divided regions centered on the eyes and on the nose and mouth which are preset in the facial image division part.

7. The system according to claim 2, wherein the facial image decision unit is configured to set a value of the normal facial image class and a value of the occluded facial image class to be different from each other and to derive the decision algorithm using the set values of the classes, eigenvectors and weights of the training images.

8. The system according to claim 5, wherein the facial image decision unit is configured to perform a process of simultaneously deciding whether the facial image is occluded in the higher and lower regions.

9. A method for detecting a face, comprising the steps of:
(a) extracting eigenvectors and weights of respective facial components from an input facial image; and
(b) obtaining an occluding-decision algorithm for deciding whether input facial images are occluded using eigenvectors and weights of a plurality of training images, and deciding whether the input facial image is occluded by substituting the extracted eigenvectors and weights of the input image into the occluding-decision algorithm,
wherein the occluding-decision algorithm is expressed as the following equation:

$$f(x) = \text{sign}\left(\sum_{i=1}^{l} y_i \lambda_i K(x, x_i) + b\right),$$

where $y_i$, $\lambda_i$ and b are factors obtained from the training images, and $K(x, x_i)$ is eigenvectors and weights extracted from the input facial image, and
wherein step (b) comprises the step of:
deciding the input facial image to be normal if a result value obtained by substituting the eigenvectors and weights into the decision algorithm is 1, and to be occluded if the result value is −1.

10. The method according to claim 9, wherein step (a) comprises the steps of:
(a1) converting the input facial image into a monochrome image;
(a2) detecting a facial region from the converted monochrome image;
(a3) normalizing the detected facial region;
(a4) dividing the normalized facial region into higher and lower regions; and
(a5) extracting the eigenvectors and weights of the respective facial components using principal component analysis (PCA) according to the divided facial regions.

11. The method according to claim 10, wherein in step (a5), eigenvectors and weights are extracted from the divided regions centered on the eyes and on the nose and mouth, respectively, which are preset according to the facial regions.

12. The method according to claim 10, wherein in step (a4), an entire facial region is divided into the higher region centered on the eyes and the lower region centered on the nose and mouth.

13. The method according to claim 12, wherein in step (b), it is simultaneously determined whether the facial image is occluded in the higher and lower regions.

14. The method according to claim 9, wherein the step of obtaining the occluding-decision algorithm comprises the steps of:

extracting the eigenvectors and weights of the respective facial components from the training images in which normal and occluded facial images are included and setting values of normal and occluded facial image classes to be different from each other; and deriving the occluding-decision algorithm using the extracted values of the image classes, eigenvectors and weights of the training images.

15. The method according to claim 14, wherein the training images are facial images to which scaling shift or rotation change is applied.

16. The method according to claim 9, further comprising the steps of:

transmitting a warning message if it is determined that the input facial image is occluded, and deciding again whether the input facial image is occluded; and rejecting authentication if it is determined that the input facial image is occluded three times or more.

\* \* \* \* \*